United States Patent [19]
Rickert

[11] 3,915,552
[45] Oct. 28, 1975

[54] COMPACT REFLEX SIGHT

[76] Inventor: Glenn E. Rickert, Community Bank Bldg., Huntington, Ind. 46750

[22] Filed: Apr. 11, 1974

[21] Appl. No.: 460,216

Related U.S. Application Data

[63] Continuation of Ser. No. 224,521, Feb. 8, 1972, abandoned.

[52] U.S. Cl. .................. 350/67; 350/10; 356/252
[51] Int. Cl.² ........................................ G02B 27/36
[58] Field of Search... 350/67, 10; 356/247, 251–255; 33/241, 246, 297, 298

[56] References Cited
UNITED STATES PATENTS

| | | | |
|---|---|---|---|
| 2,472,809 | 6/1949 | Decker | 356/251 |
| 2,948,188 | 8/1960 | Kollmorgen | 350/10 X |
| 2,997,916 | 8/1961 | Friedman et al. | 350/10 |
| 3,464,758 | 9/1969 | Giwosky | 350/10 |
| 3,642,341 | 2/1972 | Seifried | 350/10 |
| 3,645,635 | 2/1972 | Steck | 356/252 |
| 3,711,204 | 1/1973 | Steck | 350/10 X |

*Primary Examiner*—David H. Rubin
*Attorney, Agent, or Firm*—Albert L. Jeffers; Roger M. Rickert

[57] ABSTRACT

An improved gun sight having nighttime capability employing a hollow body in which pieces of tubing, wire snap rings, and adhesive materials secure the various optical parts in place as well as seal the optical system from dirt and moisture is disclosed. The adjustment system is of the internal type, but has adjustment screws external to the optical interior to prevent moisture for entering the optical system. A functioning recoil lug on the under side of the sight protrudes through a hole in the sight base of the gun, which recoil lug also contains the elevation adjustment screw permitting a more compact sight. An illuminator which may be stored in the hollow pistol grip of the gun in the daytime is removed at night and placed on the sight to illuminate the sight reticle. A luminous cross hair reticle is employed where the reticle lines are deleted at their point of intersection so as to not obscure small targets and to provide range estimating information. A special nighttime aiming system is employed which permits the user to view a target with one eye while viewing the reticle with the other eye and yet not lose peripheral binocular fusion between the two eyes. A unique method of constructing the reflex sight of the present invention employing obliquely cut tubing is also disclosed.

6 Claims, 6 Drawing Figures

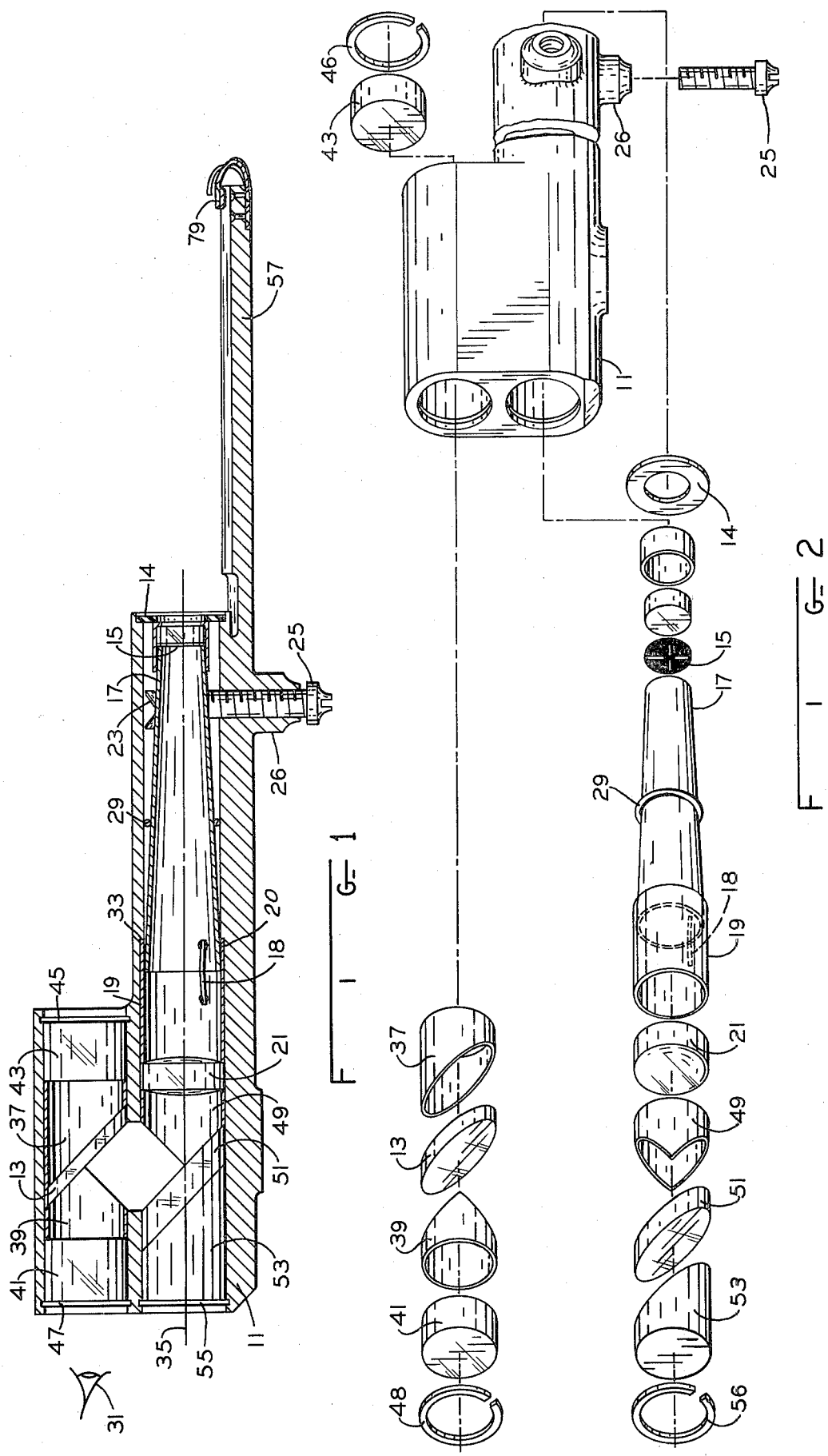

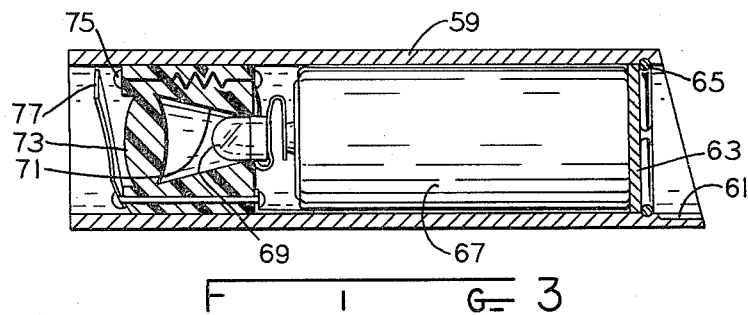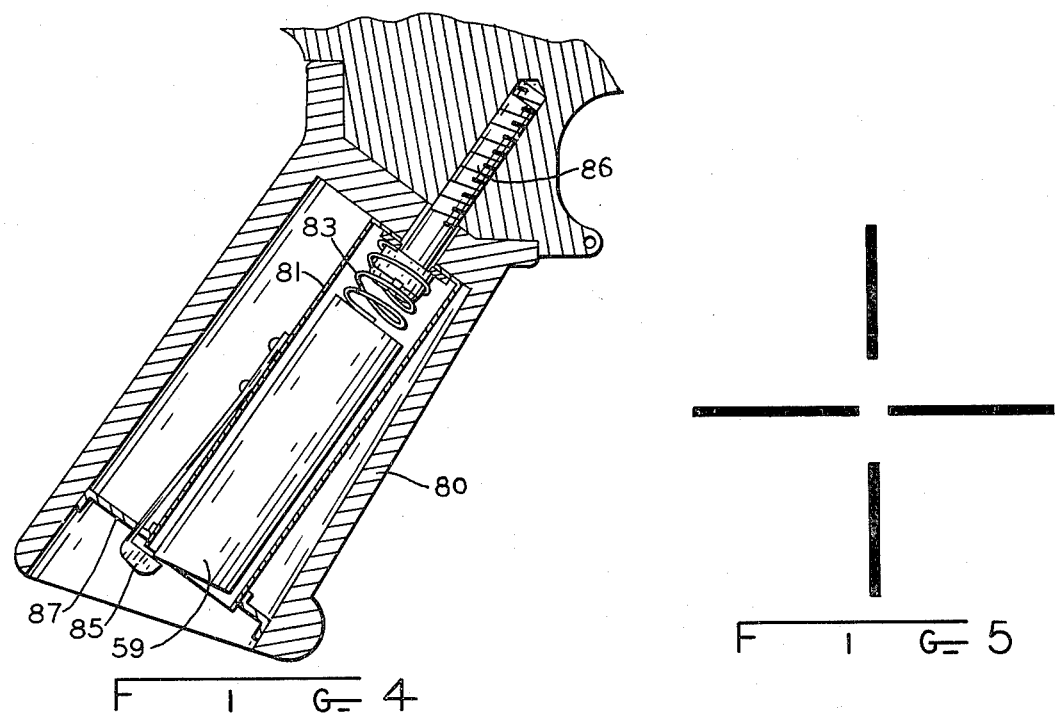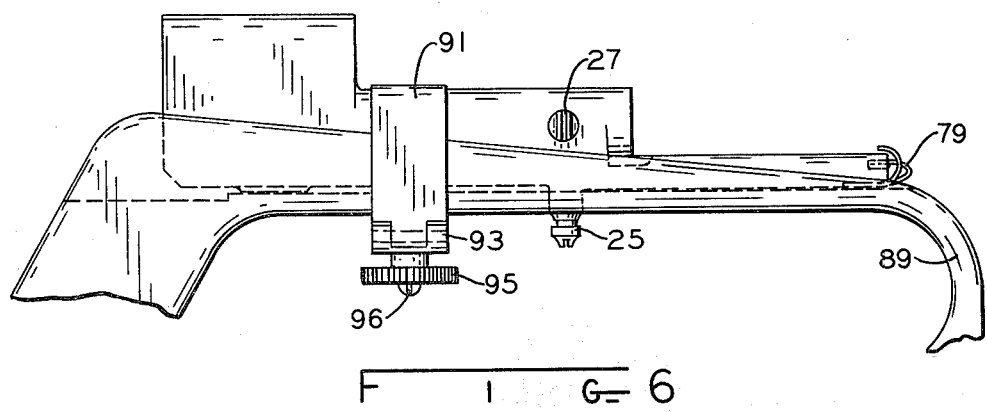

COMPACT REFLEX SIGHT

CROSS-REFERENCES TO RELATED APPLICATIONS

This application is a continuation of my copending application Ser. No. 224,521, filed Feb. 8, 1972 now abandoned. The present invention finds particular utility employing the optical principles of the reflex sight disclosed in copending application Ser. No. 732,234 entitled "Reflex Sight," filed May 27, 1968 abandoned in favor of Ser. No. 402,376. The invention is, of course, also applicable to sighting devices such as those illustrated in U.S. Pat. Nos. 3,524,710; 3,502,416; 3,439,970; and applicant's copending application Ser. No. 878,021 now U.S. Pat. No. 3,836,263. The present invention might also be utilized in a conventional rifle telescope or in improvements thereon such as illustrated in U.S. Pat. Nos. 3,121,163; 3,230,627; and 3,320,671 or in other optical devices where it is desirable to adjust a reticle relative to an optical axis.

BACKGROUND OF THE INVENTION

Prior art reflex sights have been bulky and cumbersome to place on a small arm and have generally been difficult to clean and otherwise unsuitable for military use. Previous attempts have been made to render reflex sights less fragile and precarious in their mounting, however, even the structure taught in these attempts is too large and precariously positioned to be ideally suited to military use.

One of the problems in both reflex and telescopic adjustable optical gun sights is that if the adjustment system is external to the sealed enclosure of the optical system, then this adjustment system serves as the mechanical support for the entire sight body and is rather delicate and easily bumped or jarred out of proper alignment. Due to the fragile nature of the external adjustment system virtually all present day telescopic sights have resorted to an internal adjustment system which eliminates the delicate nature of the external adjustment systems, however, since the adjustment screws must now pass through the sight body to move the internal parts of the sight, moisture and dirt may easily enter the optical system along these adjustment openings. Due to the adverse conditions under which military sights are used it becomes highly important to adequately seal the optical interior of the sight from the environment.

SUMMARY OF THE INVENTION

The present invention overcomes the above noted prior art deficiencies by providing an adjustment system which is external to the interior of the optical system of the device, yet separate from the structure for mounting the sighting device. According to the teachings of the present invention a tapered tube is employed pivotable at one end and supporting reticle indicia at the other end and spring loaded against two adjustment screws to adjust this reticle end of the tube relative to the optical axis of the device. At the large fulcrum end of the tapered tbe or somewhere between the large fulcrum end and the adjustment screws, the tapered tube is sealed flexibly to the surrounding sight body to provide sealing independent of the adjustment screws thus achieving the rugged characteristics of an internal adjustment system, yet retaining the moisture proof characteristics of an external adjustment system. The tapered tube is pivotably attached at one end to a second tube which supports the focusing element of the sight, and during assembly these tubes are longitudinally adjusted to eliminate reticle parallax with the target and then pivotably secured and inserted into the sight body as an integral unit.

A sight of the type disclosed in the aforementioned Ser. No. 732,234 application employs semitransparent and fully reflective mirrors mounted at substantially 45° to the optical axis of the device, and the present invention employs obliquely cut pieces of tubing fastened in place with adhesive materials to support these mirrors and to keep the sidewalls of the sight as thin as possible so as to cause a minimal restriction of the field of view due to sight side wall thickness. This type of construction allows a sufficiently large field of view through the sight to be adequate for daytime combat use, while retaining a sufficiently small external size so that the sight itself does not unduly obscure the view of the area surrounding a target during nighttime use thus allowing two eyed sighting without the loss of binocular fusion. This two eyed sighting under extremely adverse lighting conditions desirably employs an auxiliary light source to illuminate the recticle.

Since the life expectancy of such an auxiliary light source is much shorter than that of the sight itself, the present invention employs a removable light source which may be stored elsewhere in the daytime as, for example, in the hollow pistol grip of the U.S. Army M16 rifle and removed from its place of storage and attached to the reticle end of the sight for nighttime use. The batteries and light are a separate unit to prevent forgotten, aged and corroded batteries from damaging the sight itself.

A luminous cross hair reticle is employed where the horizontal reticle line is deleted at its point of intersection with the indicated vertical line sufficiently to prevent blocking the view of a small target while the ends are sufficiently close to indicate accurately the exact point of aim. The vertical line is deleted at its point of intersection with the indicated horizontal line so that the distance of deletion functions as a range estimator when compared to a known height such as the height of a man.

Accordingly it is one object of the present invention to provide a sighting device with an adjustment system having the rugged characteristics of an internal adjustment system and the sealing characteristics of an external adjustment system.

It is another object of the present invention to provide an improved system for obliquely mounting optical elements within a sighting device.

It is a further object of the present invention to provide a scheme for mounting optical elements where the mounting structure is sufficiently thin that it does not materially obscure the field of view.

It is still a further object of the present invention to illuminate a gun sight reticle at night without unduly complicating the gun sight structure by providing for the quick removal and secure storage of an auxiliary light source.

Yet another object of the present invention is to provide a unique method of aiming a firearm.

A still further object of the present invention is to provide a reticle for a sighting device which automatically provides corrections for the trajectory problems of great target distances.

Yet another object of the present invention is to provide a unique method of sighting over the extreme ranges of lighting conditions encountered during a 24 hour, day-night period.

These and other objects and advantages of the present invention will appear more clearly from the following detailed disclosure read in conjunction with the accompanying drawings in which:

BRIEF DESCRIPTION OF THE DRAWING

FIG. 1 is a horizontal sectional view of the present invention;

FIG. 2 is an exploded perspective view of the structure of FIG. 1;

FIG. 3 is a horizontal sectional view of the auxiliary light source of the present invention;

FIG. 4 is a horizontal sectional view of a hollow pistol grip illustrating the daytime storage arrangement for the auxiliary light source;

FIG. 5 is a graphic representation of the reticle pattern of the present invention; and FIG. 6 illustrates the present invention mounted in position on a shoulder arm having a suitcase type combination sight support and carrying handle such as the U.S. Army M16 rifle.

DESCRIPTION OF THE PREFERRED EMBODIMENT

Consider first FIG. 1 which shows in cross section a sight housing 11 containing generally the same optical elements disclosed in the aforementioned Ser. No. 732,234 application and FIG. 2 which illustrates these parts in exploded perspective. The sight of the aforementioned application has a beam combining mirror 13 through which a target may be viewed and reflected off of which is an image of a reticle. This reticle image is provided by light coming from the same general area as the target and passing through a reticle 15 of transparent lines or marks on an otherwise opaque background. This reticle 15 is mounted on a tapered tube 17, the other end of which is pivotably attached to a second tube 19 at one end, and at the other end of the second tube 19 is mounted a lens 21. A leaf spring 23 forces the tapered tube 17 toward orthogonally positioned adjustment screws 25 and 27 (of FIG. 6) so that axial movement of one of the adjustment screws will laterally displace the reticle 15 relative to the optical axis 35 of the lens 21. Tube 17 is allowed to flex relative to the tube 19, however, axial or lengthwise and rotational movement between these two tubes is prevented by the spring wire 18 which is attached to each tube at its two ends. A pliable sealant 29 flexes when the tube 17 is moved by an adjustment screw. The axial distance between the lens 21 and the reticle 15 is adjusted to be substantially the focal length of the lens 21 by moving the tapered tube 17 with respect to the second tube 19, and then securing this axial length by a spring wire 18 connection. The pair of tubes are then inserted into the sight housing from the observer 31's end of the sight so that the tube 19 comes to rest against the shoulder 33 within the housing. The wire spring 18 which connects the tapered tube 17 to the second tube 19 allows the tapered tube to pivot relative to the tube 19 but does not allow the distance between the reticle 15 and lens 21 to change. The pliable sealant 29 may be an elastic or flexible material secured to the respective parts in an annular region by a suitable adhesive, or a suitable elastic or flexible adhesive material may join the two parts at 20 as well as seal the joint between them.

Movement of the reticle 15 relative to the axis 35 of the lens 21 for adjustment purposes is provided by a pair of adjustment screws 25 and 27. The heads of these screws are provided with slots adapted to receive the rim of a rifle cartridge case or a screw driver or other implement for turning the screws. The tapered tube 17 is simultaneously forced toward the two adjustment screws by an obliquely located spring 23. Movement of the screw 25 provides elevation changes, and movement of screw 27 (of FIG. 6) provides windage adjustment. An adjustment position once selected is maintained due to frictional engagement between the adjustment screws and their respective threaded holes, for example, by deforming the tapped holes in the housing to an out of round shape, or by slotting and crimping the slotted end of the holes to a smaller diameter.

Once the tubes 17 and 19 have been inserted in the sight housing and secured therein with an adhesive, the lens 21 is inserted so as to abut the shoulder provided by the end of the tube 19. This lens may also be secured to the sight housing by an adhesive material if desired.

An obliquely cut piece of tubing 37 preferably soldered to the sight housing earlier in the assembly process is used as a stop to locate the semitransparent mirror 13. This oblique shoulder can be cast in the sight housing if the housing is made by a "lost wax" or similar casting process. The mirror 13 is held in place by a second obliquely cut piece of tubing 39, which is attached to the interior of the sight housing by an adhesive material. Windows 41 and 43 are adhesively secured and sealed, and if desired snap rings 48 and 46 can be employed in the slots 47 and 45 to insure that the windows do not drift from their proper location. Another obliquely cut piece of tubing 49 may hold the lens in place and provide a stop for a fully silvered mirror 51, which is then held in place by a plug or piece of tubing 53, which again is adhesively secured to the interior of the housing and held in place by a snap ring 56 which fits in the slot 55. The obliquely cut piece of tubing 49 may be omitted if the mirror 51 is attached to the plug 53, and a securing ring could be employed at the rear of the lens 21 to insure that the lens stays in its proper position. It is preferred that mirror 51 be a first surface mirror for ghost free reflection. Since the line of sight from an observer 31 to the reticle 15 is reflected from mirror 13 and mirror 51, the obliquely cut pieces of tubing 39 and 49 must be cut away as illustrated in FIG. 2 in order to not block this line of sight. In order to provide the capability of nighttime use of the sight, a forwardly protruding portion 57 is provided to support and secure a reticle illuminator in place.

FIG. 3 illustrates in cross section the reticle or nighttime illuminator which has a generally cylindrical shell 59 having an obliquely cut end, one portion 61 which is longer and having a bulk head 63 held in place by a snap ring 65. Inside of the bulk head is a battery 67 and forward of that a light emitting diode 69 in a reflective housing 71 having a condensing lens 73. The light emitting diode is resistively coupled to the battery and switched on and off through terminal 75 and spring contact 77. Spring contact 77 is in the form of a washer with a hole in the center where the hole permits the light from the diode to illuminate the reticle and this contact is closed when depressed by the sight body when the illuminator is applied to the sight. The illuminator is attached to the sight by placing the condensing lens end of the illuminator against the reticle end of the sight with the longer portion 61 of the cylindrical housing upward and then rotating it about its axis so that the longer portion of the obliquely cut end is rotated downward where it is secured in position by the hook arrangement 79 of FIGS. 1 and 6 on the forward end of the sight body. Inadvertent rotation of the illuminator is prevented by the detent provided in the cylindrical shell at 61 engaging the detent of the hook arrangement 79 of the sight housing.

During the daytime or other periods of nonuse, the night illuminator may be stored, for example, in the hollow pistol grip 80 of the U.S. Army M16 rifle as illustrated in FIG. 4. An illuminator receptacle 81 may be secured to the weapon by the already present pistol grip mounting screw 86. The illuminator is inserted in the receptacle 81 against the tension of the spring 83 and held in place by a snap catch or clasp 85 which may, for example, be a simple leaf spring bent at the end to hookably engage the illuminator under its own spring tension. A spacer 87 may also be provided to prevent oscillation of the lower end of the illuminator housing.

FIG. 6 illustrates the sight in position on a shoulder arm having a suitcase type combination sight support and carrying handle 89. The sight is securely fastened in position by a strap 91 having a clasp 93 and a tension screw 95 to securely tighten and hold the sight in position. The downwardly extending portion 26 (see FIGS. 1 and 2) of the housing surrounding the elevation adjustment screw 25 extends through a hole in the suitcase handle to thereby provide a recoil lug and simultaneously allow access to the vertical adjustment screw 25. To prevent longitudinal rocking of the sight when mounted on the suitcase handle, the base of the sight housing is relieved in the area of the securing strap so as to contact the suitcase handle only forward and rearward of this securing strap.

The configuration of the reticle lines seen through the sight is illustrated in FIG. 5 and may be used to provide range information. The distance of deletion from the apparent point of intersection of the horizontal and vertical indicia to the top of the lower vertical line should be such as to encompass a known height at a known distance. Thus, for example, with the rifle zeroed at 300 yards when using the U.S. Army M16 rifle cartridge, the deletion distance from the apparent point of intersection to the top of the lower line should be a man sized target when viewed at about 500 yards. Under these circumstances the same man sized target at 400 yards when placed standing on the top end of the lower vertical line will place the point of aim at shoulder level on the target, and under these circumstances the bullet will fall at a desired mid-torso point of impact at both 400 and 500 yards. With this same cartridge and with the rifle zeroed at 300 yards at ranges of 300 yards and less, the apparent point of intersection is placed on the man sized target half way between the shoulder line and waist line for mid-torso hits, since the bullet drop at these ranges is negligible. Thus the reticle of the present invention provides an automatic system for achieving mid-torso hits at up to 500 yards without changing the sight adjustments and without knowing precisely how far away the target is.

During daytime and early evening use when the target can be seen through the reflex sight, the apparent point of intersection of the reticle lines is placed on the desired point of aim and the weapon fired. During very adverse light conditions when the target cannot be seen through the semitransparent mirror of the sight, a unique two eyed shooting system is employed. The shooter's eye 31 behind the sight sees the reticle with its indicated point of aim in his very central vision, while at the same time due to the small field of view occupied by the presence of the sight this same eye sees the near peripheral area as well as the outlying peripheral area of the target view. The second eye not behind the sight sees this same outlying peripheral area and near peripheral area and in addition sees the actual center of the target. Under this circumstance of both eyes seeing the near and outlying peripheral areas the two eyes hold binocular fusion sufficient to permit the shooter to effectively aim his weapon even though the target and reticle are not seen by a single eye simultaneously as is done using prior sighting techniques.

While the present invention has been described with respect to a specific embodiment, numerous modifications will suggest themselves to those of ordinary skill in the art. An example of such an obvious modification is where the sight is employed on a gun receiver of more conventional design where there is no "suitcase handle" and the elevation screw is placed on the top of the sight body instead of the bottom, and the adjustment screw head is made much flatter and buried in the sight body or permitted to protrude upward very little so as to not obscure the field of view of the target by the observer. Another obvious modification is to substitute exotic light sources such as liquid light or atomic powered light in place of the battery and solid state light source shown here in the night illuminator unit. Yet another modification is to substitute a short reticle tube for the tapered reticle tube, and to pivotably attach it to the sight body at some point near the lens by a wire or blade, and to flexibly seal the end of the short tube to the sight body which is closest to the lens. Accordingly the scope of the present invention is to be measured only by that of the appended claims.

I claim:

1. In a collimating reflex sighting device having a hollow sight housing containing optical elements including at least a collimating lens, and a first fully reflective optical element and a second semi-transparent optical element arranged in periscopic relation and fixed within the housing, the housing having first and second openings at opposite ends of a sight path through the sighting device from an observer to a target and a target area light passing opening and having at least one passageway in the housing through which externally accessible adjustment means for changing aim of the sighting device pass, an improved structure for protecting the internal optical element surfaces from dirt and moisture comprising:

a tube sealed near one end and pivotably supported within the sight housing near the tube's other end so as to allow only negligible axial movement of the tube relative to the sight housing, the tube said one end being located adjacent the light passing opening;

a reticle supported within the tube near said sealed one end to be illuminated by light passing through the adjacent light passing opening, said adjustment means engaging the tube for moving the reticle relative to other optical elements within the housing;

means flexibly sealing the tube to the interior of the housing in an annular region between the adjustment means passageway and the first and second periscopically arranged optical elements to provide a seal therebetween independent of the adjustment means; and transparent means sealingly secured in the first and second housing openings to thereby define a sealed housing interior with the adjustment means exterior thereof and with the first and second optical elements and collimating lens within the sealed housing interior and thus protected from dirt and moisture.

2. In a collimating reflex sighting device having a sight housing containing optical elements some of which are fixed relative to the housing, the housing having first and second openings at opposite ends of a sight path through the sighting device from an observer to a target and a target area light passing opening and having at least one passageway in said housing through which externally accessible adjustment means for changing aim of the sighting device pass, an improved structure for protecting the internal optical element surfaces from dirt and moisture comprising:

a tapered tube sealed near the smaller end and supported within the sight housing, the tube smaller end being located adjacent the light passing opening;

a reticle having transparent reticle indicia on an otherwise opaque background for passing light from the general area of the target by way of the light passing opening into the housing and supported within the tube near said sealed smaller end, said adjustment means engaging the tube for moving the reticle relative to other optical elements within the housing;

first and second transparent windows sealingly secured in the first and second housing openings;

the optical elements including collimating means for providing a collimated image of the reticle indicia, and semi-transparent means for superimposing the collimated image and the target view, the semi-transparent means being disposed in the sight path from the observer to the target intermediate the first and second windows, and the collimating means being disposed intermediate the reticle and the semi-transparent means; and means flexibly sealing the tube to the housing in a region between the adjustment means passage and the fixed optical element within the housing to sealingly separate the adjustment means from the other optical elements and thereby provide an adjustment means which operates internal to the sight housing for mechanical protection and yet is external to the sealed optical system for dirt and moisture protection thereby providing a sealed housing interior with the adjustment means exterior thereof and with the other optical elements within the sealed housing interior and thus protected from dirt and moisture.

3. The improvement of claim 2 wherein the sight path through the sight housing is a substantially straight line through the semi-transparent means, the sight housing including at least one piece of tubing substantially coaxial with the sight path and having an obliquely cut end for supporting the semi-transparent means obliquely to the sight path, and wherein the means flexibly sealing is adhesively secured to the tube completely about an annular portion of the tube.

4. In an optical sighting device of the collimating reflex type having a collimating lens and first and second reflective optical elements arranged in periscopic relation and having a sight housing through which externally accessible adjustment means pass, the housing having first and second openings at opposite ends of a sight path through the sighting device from an observer to a target and a target area light passing openings, an improved structure for protecting the internal optical sight elements from dirt and moisture comprising:

first and second tube members disposed within said housing, said second tube having a sight reticle positioned therein and transparent means sealing one end thereof, the sight reticle being located adjacent to the light passing opening;

means connecting said first tube member to said housing;

means flexibly connecting said first and second tube members together and adapted to allow only negligible relative axial movement therebetween;

means flexibly sealing said second tube member to the housing to provide a seal independent of the adjustment means;

motion transmission means coupling said adjustment means to said second tube member at a location more remote from said flexible connection than the location of the flexible sealing means; and transparent means sealingly secured in the first and second housing openings to thereby define a sealed housing interior with the adjustment means exterior thereof and with the collimating lens and the first and second reflective optical elements within the sealed housing interior and thus protected from the dirt and moisture.

5. The improvement of claim 4 wherein the sight housing includes at least one piece of tubing substantially coaxial with the sight path and having an obliquely cut end for supporting one of the reflective optical elements obliquely to the sight path, and wherein the means flexibly sealing is adhesively secured to the second tube member completely about an annular portion of that second tube member.

6. In a collimating reflex sighting device having a hollow sight housing containing optical elements including at least a collimating lens, and a first fully reflective optical element and a second semi-transparent optical element arranged in periscopic relation and fixed within the housing, the housing having first and second openings at opposite ends of a sight path through the sighting device from an observer to a target and a target area light passing opening and having at least one passageway in the housing through which externally accessible adjustment means for changing the aim of the sighting device pass, an improved structure for protecting the internal optical element surfaces from dirt and moisture comprising:

a tube sealed near one end and pivotably supported within the sight housing near the tube's other end so as to allow only negigible axial movement of the tube relative to the sight housing;

a reticle supported within the tube near said sealed one end, said adjustment means engaging the tube for moving the reticle relative to other optical elements within the housing;

means flexibly sealing the tube to the interior of the housing in an annular region between the adjustment means passageway and the first and second periscopically arranged optical elements to provide a seal therebetween independent of the adjustment means; and an optical element sealingly affixed in the housing to define in conjunction with the flexible sealing means a sealed housing interior with the adjustment means exterior thereof and at least one surface of the last-mentioned optical element and one of the first and second periscopically arranged optical elements within the sealed housing interior and thus protected from dirt and moisture.

* * * * *

UNITED STATES PATENT AND TRADEMARK OFFICE
CERTIFICATE OF CORRECTION

PATENT NO. : 3,915,552
DATED : October 28, 1975
INVENTOR(S) : Glenn E. Rickert

It is certified that error appears in the above-identified patent and that said Letters Patent are hereby corrected as shown below:

In the Abstract: line 8, delete "for" and substitute therefor -- from --.

Column 1, line 62, delete "tbe" and substitute therefor -- tube --.

Col. 7, Claim 2, line 52, delete "element" and substitute therefor -- elements --.

Col. 8, Claim 4, line 12, delete "openings" and substitute therefor -- opening --.

Col. 8, Claim 4, line 39, delete "the".

Col. 8, Claim 6, line 58, delete "the" (first occurrence).

Col. 8, Claim 6, line 64, delete "negigible" and substitute therefor -- negligible --.

Signed and Sealed this twenty-fourth Day of February 1976

[SEAL]

Attest:

RUTH C. MASON
*Attesting Officer*

C. MARSHALL DANN
*Commissioner of Patents and Trademarks*